US007883571B1

(12) United States Patent
Lane et al.

(10) Patent No.: US 7,883,571 B1
(45) Date of Patent: Feb. 8, 2011

(54) PURIFICATION METHOD AND JUNCTION FOR RELATED APPARATUS

(75) Inventors: Jonathan Andrew Lane, Amherst, NY (US); David M. Reed, E. Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 12/900,610

(22) Filed: Oct. 8, 2010

Related U.S. Application Data

(62) Division of application No. 12/112,464, filed on Apr. 30, 2008, now Pat. No. 7,833,314.

(51) Int. Cl.
*B01D 53/22* (2006.01)

(52) U.S. Cl. .......................... 96/8; 96/73; 96/83; 96/88

(58) Field of Classification Search ....................... 96/4, 96/7–9, 60, 73, 74, 83, 88; 95/12, 23, 45, 95/54, 73, 78; 204/164
See application file for complete search history.

(56) References Cited

U.S. PATENT DOCUMENTS 3,930,814 A * 1/1976 Gessner ......................... 95/19
3,976,451 A * 8/1976 Blackmer et al. ................ 96/7
4,300,922 A * 11/1981 Gupner .......................... 96/88
4,578,088 A * 3/1986 Linscheid ....................... 95/78
4,609,383 A * 9/1986 Bonaventura et al. .......... 95/46
4,618,351 A * 10/1986 Esper et al. ..................... 96/88
4,634,806 A * 1/1987 Haag et al. .................. 174/211
5,006,134 A * 4/1991 Knoll et al. .................... 96/88
5,035,726 A 7/1991 Chen et al.
5,061,297 A * 10/1991 Krasberg ......................... 95/1
5,454,923 A 10/1995 Nachlas et al.
5,547,494 A 8/1996 Prasad et al.
5,837,125 A * 11/1998 Prasad et al. ................ 205/763
5,944,874 A 8/1999 Prasad et al.
6,382,958 B1 * 5/2002 Bool et al. ..................... 431/2
6,430,966 B1 8/2002 Meinhardt et al.
7,179,323 B2 * 2/2007 Stein et al. ..................... 95/54
7,374,601 B2 * 5/2008 Bonchonsky et al. ......... 95/138
7,510,594 B2 * 3/2009 Wynn et al. .................... 95/45
7,658,788 B2 * 2/2010 Holmes et al. ................... 96/7
7,833,314 B2 * 11/2010 Lane et al. ..................... 95/54
2007/0137478 A1 * 6/2007 Stein et al. ..................... 95/54
2009/0272268 A1 * 11/2009 Lane ............................ 95/67

FOREIGN PATENT DOCUMENTS

JP 56-136605 A * 10/1981 .................... 95/54

OTHER PUBLICATIONS

Ciacchi, F. T. et al., "Tubular zirconia-yttria electrolyte membrane technology for oxygen separation", Solid State Ionics 152-153, 2002, pp. 763-768.

* cited by examiner

*Primary Examiner*—Richard L Chiesa
(74) *Attorney, Agent, or Firm*—David M. Rosenblum

(57) ABSTRACT

Purification method and apparatus for purifying a gas stream by oxygen removal. The apparatus includes primary and secondary oxygen separation zones and tubular electrically driven oxygen separation elements. There are more elements in the primary zone than the secondary zone so that low concentrations of oxygen can be obtained in a purified stream and turbulent flow conditions can also be obtained that will permit purification to very low levels. In addition, a junction is provided to connect the tubular separation elements to metallic elements such as manifolds.

6 Claims, 2 Drawing Sheets

PURIFICATION METHOD AND JUNCTION FOR RELATED APPARATUS

RELATED APPLICATIONS

This application is a divisional of prior U.S. application Ser. No. 12/112,464, filed Apr. 30, 2008, and now U.S. Pat. No. 7,833,314.

FIELD OF THE INVENTION

The present invention relates to a method of purifying a gas stream by removing oxygen from the gas stream with the use of electrically driven oxygen separation elements and a ceramic to metal junction to connect such elements to a metallic element that is used to introduce flow to and receive flow from such oxygen separation elements.

BACKGROUND OF THE INVENTION

It is known in the art to purify a gas stream by separating oxygen from the gas stream with the use of electrically driven oxygen ion transport elements. Such elements are provided with a composite structure that includes an electrolyte layer to conduct oxygen ions that is located between two electrode layers to apply an electrical potential across the electrolyte. The electrode layers are porous and can have sublayers while the electrolyte is an air-tight dense layer. The resultant composite structure can be in the form of a tube in which the oxygen containing feed is fed to the inside of the tube and the separated oxygen is collected on the outside of the tube and then dissipated. The reverse is possible and oxygen can be fed to the outside of the tube and the permeated oxygen collected on the inside of the tube. Other forms are possible, for example, flat plates and honeycomb-like structures.

The electrolyte layer is formed of an ionic conductor that is capable of conducting oxygen ions when subjected to an elevated temperature and an electrical potential is applied to the electrode layers. Under such circumstances, the oxygen ions will ionize on one surface of the electrolyte layer and under the impetus of an electrical potential, will be transported through the electrolyte layer to the opposite side where the oxygen ions will recombine into molecular oxygen. Typical materials that are used to form the electrolyte layer are yttrium stabilized zirconia and gadolinium doped ceria. The electrical potential is applied to the electrolyte by way of a cathode and anode electrodes. The oxygen ionizes at the cathode and the oxygen ions recombine at the anode. Typically, electrodes can be made of mixtures of the electrolyte material and a conductive metal, a metal alloy or an electrically conductive perovskite.

In order to distribute current to the electrodes, current collectors are utilized in the form of layers on the electrodes opposite to the electrolyte. Typical current collectors in the art have included conductive metals and metal alloys, such as silver as well as mixtures of such metals and metallic oxides.

U.S. Pat. No. 5,547,494 discloses the use of such electrically driven oxygen ion transport elements in the purification of a feed stream by separating oxygen from the feed stream. In a particular embodiment shown in FIG. 7, there are two process stages placed in series. The initial stage has more process modules than the second stage. However, in each stage the process modules are connected in parallel with respect to the flow of the gas. Fewer modules are provided in a second stage because less oxygen is present in the feed gas after having passed through the first stage. In each stage, all the process modules are electrically connected in series. Each of the stages is separately powered. The series connection consumes less power than had each of the process modules then connected in parallel. Moreover, if a common power source were used for both of the stages, the second downstream stage having less oxygen to separate would be overpowered resulting in the downstream oxygen separation elements potentially being damaged. The problem with the type of arrangement illustrated in this patent is that each of the modules is a separately enclosed structure. Since the electrically driven oxygen ion transport elements must be heated to properly function, power consumed in electrically heating the modules becomes a significant expense. Moreover, in purification applications since there is a low concentration of oxygen in the second stage, oxygen molecules that are more remote from the cathode electrodes of the oxygen ion separation elements will never be separated.

As will be discussed, the present invention, among other advantages, provides a staged purification method that is far more efficient than the apparatus of the prior art in that turbulent flow is induced in the downstream oxygen ion transport elements to ensure that more oxygen will contact the element to be separated from the stream to be purified. Moreover, a much simpler arrangement of elements is provided that can be heated more efficiently than module-like elements of the prior art. In this regard, a juncture between the ceramic elements and a metallic element is provided that makes fabrication of an apparatus in accordance with the present invention much more cost effective than fabrication techniques of the prior art.

SUMMARY OF THE INVENTION

In one aspect, the present invention provides a method of purifying a gas stream by removing oxygen from the gas stream to produce a purified gas stream.

In accordance with this aspect of the invention, the gas stream is divided into subsidiary gas streams. The subsidiary gas streams are introduced into primary oxygen separation elements to separate a primary portion of the oxygen from the gas stream. A partly purified gas stream is collected from the primary oxygen separation elements after separation of the primary portion of the oxygen from the gas stream. The partially purified gas stream is introduced into a secondary oxygen separation element that separates a secondary portion of the oxygen from the partly purified gas stream. This produces the purified gas stream. The purified gas stream is discharged from the secondary oxygen separation element.

Each of the primary oxygen separation elements and the secondary oxygen separation elements are configured to separate the oxygen through electrically driven oxygen ion transport occurring within the primary oxygen separation elements and the secondary oxygen separation element. These primary and secondary oxygen separation elements are heated to an operational temperature at which the oxygen ion transport can occur and are provided with a first electric potential applied to the primary separation elements and a second electric potential applied to the secondary oxygen separation elements to drive the oxygen ion transport.

The subsidiary gas streams flowing through the primary oxygen separation elements flow under conditions of laminar flow and the secondary oxygen separation elements are sized such that turbulent flow conditions exist within the secondary oxygen separation element. The turbulent flow condition ensures that the dilute concentration of oxygen that exists in the secondary oxygen separation element will be able to undergo ion transport and thus be removed from the feed stream in producing the purified stream.

While there is no particular form for the primary and secondary oxygen separation elements, preferably, for reasons that will be better understood hereinafter, such elements are of tubular configuration.

Turbulent flow condition can be in a Reynolds number range of between about 2,100 and about 30,000. More preferably, the turbulent flow conditions are in a Reynolds number range of between about 2,100 and about 20,000. Most preferably, the turbulent flow conditions are in a Reynolds number range of between about 2,100 and 10,000.

In another aspect, an apparatus is provided for purifying a gas stream by removing oxygen from the gas stream to produce a purified gas stream. In this aspect of the present invention, a primary separation zone is provided. The primary separation zone comprises primary oxygen separation elements of tubular form to separate a primary portion of the oxygen from the gas stream and thereby to produce a partly purified gas stream. The primary oxygen separation elements are connected between an inlet manifold and an outlet manifold such that the gas stream is divided into subsidiary streams. The subsidiary streams are introduced into the primary oxygen separation elements in parallel and are collected therefrom to produce the partly purified gas stream. A secondary separation zone is connected to the outlet manifold. The secondary separation zone comprises a secondary oxygen separation element of tubular form connected to the primary separation zone to separate a secondary of the oxygen from the partly purified gas stream. This produces the purified gas stream.

The primary oxygen separation elements and the secondary oxygen separation elements separating the primary portion of the oxygen and the secondary portion of the oxygen, respectively, function through electrically driven oxygen ion transport. As such, a first electrical power supply is connected to the primary oxygen separation elements to apply a first electric potential to the primary oxygen separation elements and thereby to drive the oxygen ion transport occurring within the primary oxygen separation elements. The primary oxygen separation elements are electrically connected to one another in series. A secondary electrical power supply is connected to the secondary oxygen separation element to apply the second electric potential to the secondary oxygen separation element. This drives the oxygen ion transport occurring within the secondary oxygen transport element. An insulated enclosure is provided to contain the primary separation zone and the secondary separation zone. The insulated enclosure has a heater to heat the primary and secondary oxygen separation elements to an operational temperature at which oxygen ion transport will occur. As such, the present invention provides an apparatus in which modules do not have to be separately heated and far simpler to fabricate.

As will be discussed, the inlet manifold and the outlet manifold can be fabricated from a metal. Therefore, it becomes highly problematical to connect the ceramic oxygen separation elements to such a metal manifold. This is solved by yet another aspect of the present invention in which a junction connecting a tubular ceramic oxygen ion transport element to a metallic element that is configured to introduce flow to or receive flow from the tubular ceramic oxygen transport element is provided. In this aspect of the invention a ceramic adapter of tubular configuration is provided. The ceramic adapter has a first axial bore. A metal connector is provided that has a second axial bore. The tubular ceramic oxygen transport elements are partially telescoped within the first axial bore of the ceramic adapter and the ceramic adapter is partially telescoped within the second axially bore of the metal connector such that flow communication for the flow is established between the tubular ceramic oxygen ion transport element, the first axial bore and the second axial bore. A glass seal is located between the tubular ceramic oxygen transport element and the tubular ceramic oxygen transport element is connected and sealed within the ceramic adapter. A glass to metal seal is located within the second axial bore such that the ceramic adapter is connected to and sealed within the metal connector. The metal connector is then connected to the metallic element.

Preferably, the first axial bore has a first enlarged end section to define a cylindrical sealing surface surrounding the tubular oxygen ion transport element. The glass seal is located between the first enlarged end section and the tubular oxygen ion transport element. The second axial bore has a second enlarged end section surrounding the ceramic adaptor and the glass to metal seal is located between the second enlarged end section and the ceramic adaptor. The metallic element can be a manifold and the metal connector can be connected to a projection, projecting from the manifold and forming part of the manifold. In this regard, the connection can be made by a compression fitting forming part of the metal connector.

The present invention in this later aspect of a junction has application to any tubular oxygen ion transport element. For example, there are elements in which there are mixed conductors so that oxygen ions and electrons can be simultaneously transported through a dense layer of ceramic material. However, with respect to electrically driven oxygen ion transport element that has an electrolyte layer located between the two electrode layers and two current collector layers located adjacent to the two electrode layers, the ceramic adapter can be provided with a via filled with silver laterally penetrating the ceramic adapter and communicating with the first axial bore. A silver mesh can be positioned within the first axial bore so as to contact one of the two current conductor layers located within the tubular oxygen ion transport element and the via. A silver paint penetrates the silver mesh to hold the silver mesh in place.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
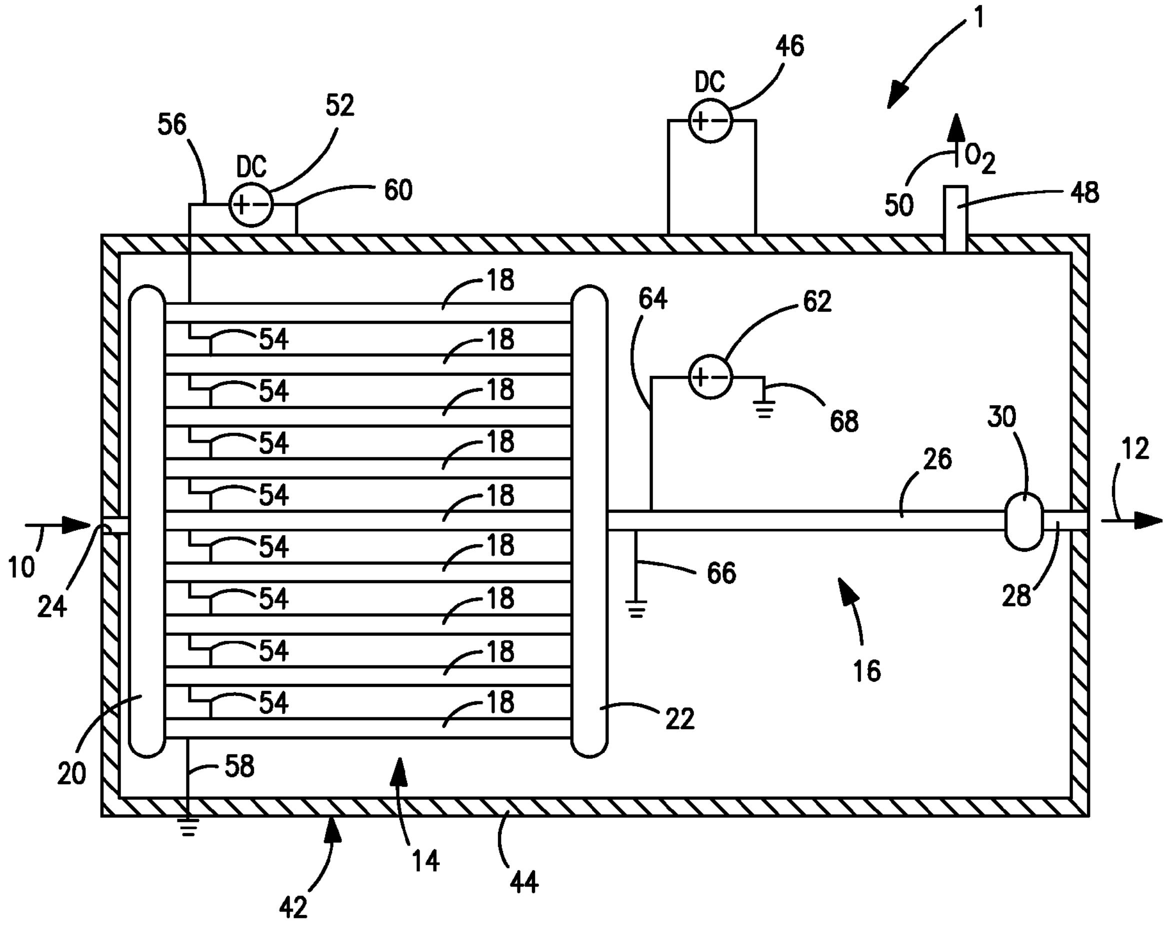
FIG. 1 is a schematic representation of an apparatus for carrying out a method in accordance with the present invention in which a feed stream is purified by oxygen removal.

With reference to FIG. 1 an apparatus 1 is illustrated for removing oxygen from a gas stream 10 to produce a purified gas stream 12. Apparatus 1 has a primary separation zone 14 that is provided to separate a primary portion of the oxygen from the gas stream 10 to produce a partly purified stream. A secondary separation zone 16 is provided to separate a secondary portion of the oxygen from the partly purified gas stream produced in primary separation zone 14 to produce the purified gas stream 12. For example, assuming that gas stream 10 has about 1 percent of oxygen, the primary separation zone removes most of the oxygen and to a level of between about 100 to about 500 ppm. This partially purified gas stream is then further purified within secondary separation zone 16 to remove the oxygen to a level of less than 10 ppm. Assuming that gas stream 10 comprises nitrogen and oxygen, the purified gas stream 12 could contain nitrogen less than 10 ppm oxygen.

The primary separation zone 14 comprises primary oxygen separation elements 18 that are connected between an inlet manifold 20 and an outlet manifold 22. Gas steam 10 is introduced into inlet manifold 10 via inlet 24, the partly purified gas stream thus collects within outlet manifold 22 and the partly purified gas stream 22 is further purified within the secondary oxygen separation element 26. The purified gas stream is then discharged from the secondary oxygen separation element 26 through an outlet 28 that is connected to secondary oxygen separation element 26 by a glass to metal seal 30. This is necessary because as will be discussed hereinafter, both the primary oxygen separation elements 18 and the secondary oxygen separation element 26 are both made of ceramics. Additionally, inlet manifold 20 and outlet manifold 22 as well as inlet 24 are also made of metal. As will be discussed, the primary oxygen separation elements 18 are thus connected to the inlet manifold 20 and the outlet manifold 22 by a junction that will be discussed hereinafter.

Both the primary oxygen separation elements 18 and the secondary oxygen separation element 26 are identical and function by electrically driven oxygen ion transport.

Figure 2:
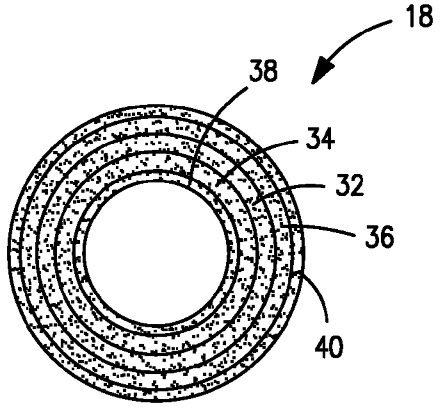
FIG. 2 is a cross-sectional view of an oxygen separation element utilized in FIG. 1.

With reference to FIG. 2, a primary oxygen separation element 18 is illustrated and is of tubular form. Primary oxygen separation element 18 is provided with an electrolyte layer 32 and opposed cathode and anode electrodes 34 and 36 to apply an electrical potential across electrolyte layer 32 and thereby drive the oxygen ion transport from the inside of primary oxygen separation element 18 to the outside of primary oxygen separation element 18. Electrical current is distributed along the length of primary oxygen separation element 18 into the cathode electrode layer 34 and the anode layer 36 by way of a current collector layer 38 located adjacent to cathode electrode 34 and a current collector layer 40 adjacent to anode electrode 36.

As well known in the art, the electrolyte layer 32 is formed of an ionic conductor, for instance yttrium stabilized zirconia or gadolinium doped ceria. The cathode and anode electrodes 34 and 36 can be formed of a mixture of the material used in forming the electrolyte layer 32 and an electronic conductor for thermal compatibility. For example, an electronic conductor can be a metal or metal alloy containing silver or an electrically conductive perovskite. The current collectors 38 and 40 can be a metallic conductor or an alloy, for instance, silver or silver pore formed of silver particles containing surface deposits of a metallic oxide, for example, yttrium stabilized zirconia to inhibit aging of the current collectors. As known in the art, cathode layer 34 and anode layer 36, as well as current collectors 38 and 40, are porous structures to allow the oxygen containing feed to contact the electrolyte layer 32 to allow oxygen ions to recombine and be discharged from anode layer 36 and current collector 40. It is to be pointed out, that no particular structure of the electrically driven element is preferred and many examples exist in the prior art.

In addition to the application of an electrical current, the primary oxygen separation elements 18 and the secondary oxygen separation elements 16 must be heated to an operational temperature of between 400° C. and 1000° C. in order for oxygen ion transport to occur within most electrolyte materials. To such end, the primary oxygen separation zone 14 and the secondary oxygen separation zone 16 and all of their components are housed within a heated electrically insulated enclosure 42 that has electrical heating elements embedded within layers of insulation 44. In this regard, electrical power source 46 is provided for such purposes. Such insulation having the embedded heating elements can be obtained from Watlow Electric Manufacturing Company of 12001 Lackland Road, St. Louis, Mo., USA 63146 and consists of high temperature iron-chrome-aluminum (ICA) heating element wire with ceramic fiber insulation. Separated oxygen discharged from enclosure 42 through an outlet 48 as a stream 50.

Although not illustrated, a blower is known in the art could be provided to supply the impetus for gas stream 10 to pass through the purification apparatus 1 although this would not be necessary if gas stream 10 were provided at pressure. Additionally, a blower could be attached to enclosure outlet 48 to discharge the oxygen so that it dissipates within the atmosphere.

Power is supplied to the primary oxygen separation elements 18 by way of an electrical power source 52 that is grounded to the enclosure 42. Power supplied to the primary oxygen separation elements by series connections 54. Electrical conductors 56 and 58 are provided to supply current to primary oxygen separation elements 18 and to ground such elements, respectively. Additionally, an electrical conductor 60 is provided to ground power supply 52 to the enclosure 42.

As can be appreciated, the connection of the primary oxygen separation elements 18 between inlet manifold 20 and outlet manifold 22 produces division of the gas stream 10 into subsidiary streams flowing within the inside of each of the primary oxygen separation elements 18. The electrical connection of the oxygen separation elements 18 in series allows substantially the same amount of oxygen to be removed by each such element because the current through each element is the same. Consequently, the same amount of oxygen could be removed in each of the primary oxygen separation elements 18. However, it is practically implausible that the flow of oxygen within each of such tubes would be the same. As such, the use of only the primary oxygen separation zone 14 practically limits the amount of oxygen that could be removed from the gas stream 10. This problem is solved by the secondary oxygen element 26 that removes the final amount of oxygen from gas stream 10 to produce the purified gas stream 12.

Secondary oxygen separation element 26 is provided with its own power supply 62 having an electrical conductor 64 to supply the electrical power to secondary oxygen separation element 26. Grounded electrical conductors 66 and 68 are provided to complete the circuit. The ground would be in practice made to the insulated enclosure 42. As can be appreciated, without the separate power supply 62, if secondary oxygen separation element 26 were connected to the primary oxygen separation element 18 in series, given the reduced content of oxygen, secondary oxygen separation element 26 would be electrochemically reduced to potential destruction.

As can also be appreciated, given the very low concentration of oxygen passing through the secondary oxygen separation element 26, oxygen that is remote from current collector 38 will never be ionized to participate in the contemplated oxygen ion transport. In order to overcome this deficiency and to improve the efficiency of purification apparatus 1, the pressure and flow of gas stream 10 entering primary oxygen separation zone 14 is such that the flow through primary oxygen separation elements 18 is laminar while the flow through the secondary oxygen separation element 26 is turbulent. Preferably, the turbulence can be expressed by way of a Reynold's number, a dimensionless quantity that is equal to twice the product of velocity, fluid density and tube radius divided by the viscosity of the fluid. Hence, if the flow is known, the tube radius of secondary oxygen separation element 26 can be selected to produce turbulent flow. In this regard, the flow through the secondary oxygen element 26 should have a Reynold's number of between about 2,100 and 30,000, more preferably between 2,100 and 20,000 and most preferably between 2,100 and 10,000. As can be appreciated, the higher the Reynold's number, the higher the velocity and therefore the higher the pressure drop within each of the elements. The primary oxygen separation elements 18 can be sized such that the flow through these elements is laminar.

Preferably, the electrolyte layer 32 of each of the elements can be fabricated from 6 mole percent scandia and 1 mole percent ceria doped zirconia. Each of the tubes can be approximately 91 cm long with an outside diameter of 6.35 mm and a wall thickness of approximately 0.5 mm. Strontium doped lanthanum maganate electrode layers 34 and 36 can be applied. Preferably as illustrated there are 9 primary oxygen separation elements 18 and a single secondary oxygen separation element 26. However, more or less primary oxygen separation elements 18 could be provided and more than one secondary oxygen separation element 26 could be provided. There are preferably between 7 and 15 of the primary oxygen separation elements 18 in any application of the present invention and a single secondary oxygen separation element 26. The applied voltage across all such elements is preferably between about 1.3 volts and 1.7 volts. The current passing through each of the primary oxygen separation elements 18 and the secondary oxygen element 26 could be between about 0 and 20 A. Under such circumstances, the oxygen content of the gas stream 10 can be between about 0.1 percent and about 2 percent and the partially purified stream exiting the first separation zone 14 can thereby have anywhere from between 100 and 200 ppm oxygen. The secondary oxygen separation element 26, the purified stream 12 can be discharged by less than 10 ppm. This assumes feed has a flow rate of between about 10 and about 100 standard liters per minute and a pressure of about 100 psig.

Figure 3:
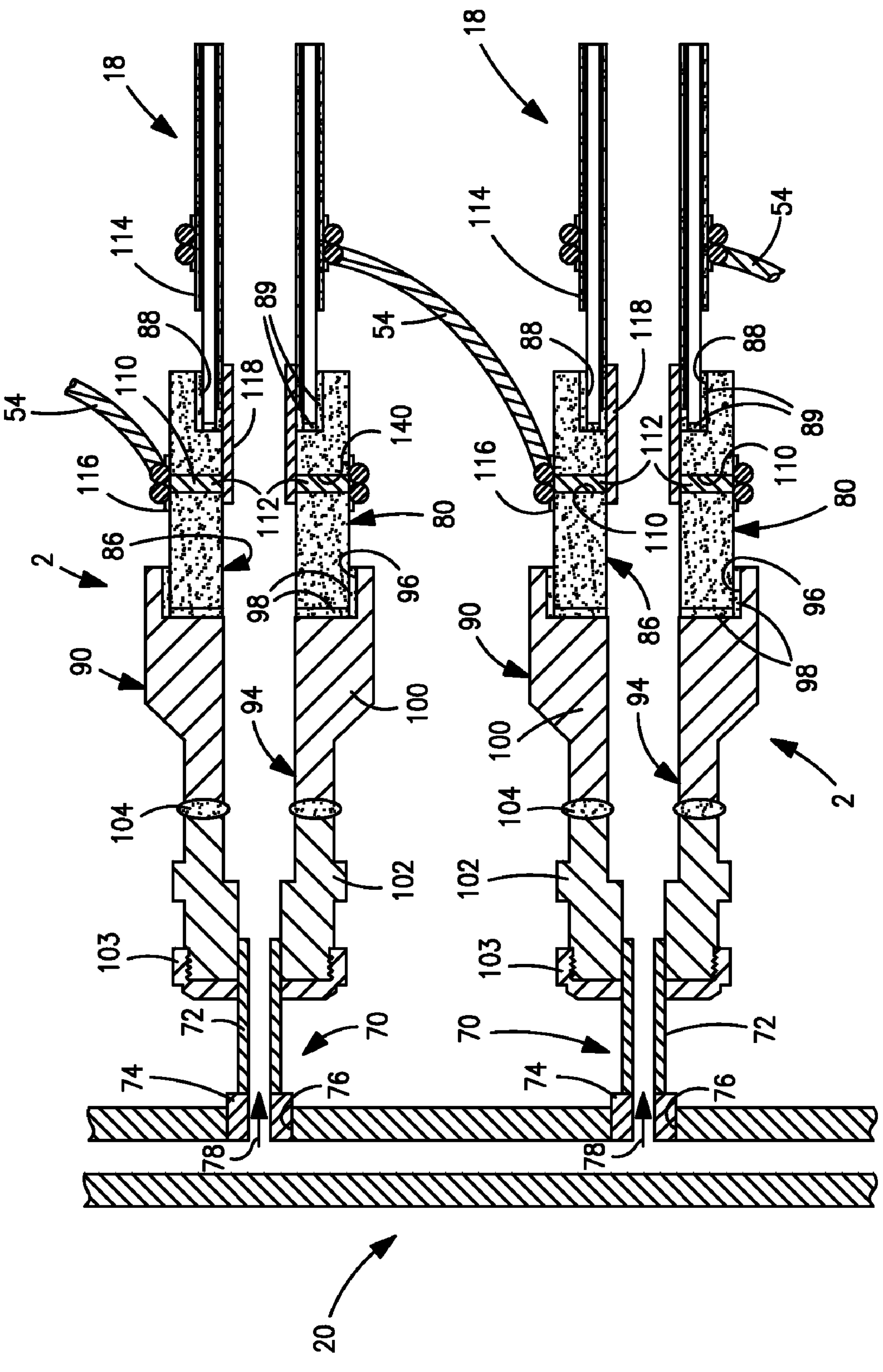
FIG. 3 is a fragmentary, cross-sectional view of FIG. 1 illustrating the connection of the oxygen separation elements to an inlet manifold and the electrical connection between elements.

As indicated above, the connection of a ceramic element to a metal such as primary oxygen separation elements 18 to the inlet and outlet manifolds 20 and 22 and the secondary oxygen separation element 26 to outlet manifold 22 can be highly problematical. In this regard, the inlet manifold 20 and the outlet manifold 22 are each formed of IN600 alloy. Hence, with reference to FIG. 3, a metallic to ceramic junction 2 is provided in accordance with the present invention and is illustrated with respect to the primary oxygen separation elements 18 and the inlet manifold 20. As indicated above, inlet manifold 20 is by and large a tubular element formed of a metal and is provided by projections, 70 having a tubular portions 72 welded to thicker, truncated tubes 74 that is in turn welded within bores 76 provided in manifold 20. This produces subsidiary flows 78 within primary oxygen separation elements 18. In the illustrated embodiment, the metallic to ceramic junction 2, connects each of the tubular oxygen separation elements 18 to manifold 20 and specifically, to tubular portions 70.

Metallic to ceramic junction 2 is provided with a ceramic adapter 80 of tubular configuration. Ceramic adapter 80 is provided with first axial bore 86. In order to facilitate the assembly of primary oxygen separation elements 18 to ceramic adapter 80, first axial bore 86 is provided with an enlarged end section 88 in which the primary oxygen separation elements 18 are partially telescoped. Glass seals 89 are located between the first enlarged end sections 88 and the outer surface of primary oxygen separation elements 18 to seal and connect the primary oxygen separation elements 18 to the ceramic adapters 80. As illustrated, the glass seals 89 have material situated between the outer surfaces of the ends of second oxygen separation elements 18 and the inner surfaces of first enlarged end sections 88. Such a glass seal can be a glass seal obtained from Ferro Corporation of 1000 Lakeside Avenue, Cleveland, Ohio, USA 44114-7000 and sold as FERRO CF 7567 or a glass-ceramic seal such as is described in U.S. Pat. No. 6,430,966.

The metallic to ceramic junction 2 also has a metal connector 90, each having a second axial bore 94. The ceramic adapters 804, as illustrated, are partially telescoped within second axial bores 94 of the metal connectors 90. Preferably, second axial bores 94 are provided with enlarged end sections 96 to accommodate the ceramic adapters 80 in a partially telescoped fashion. Glass to metal seals 98 are located between the ends and outer surfaces of ceramic adaptors 80 and the inner surfaces of second enlarged end sections 96. As illustrated, the glass to metal seals 98 have material situated between the outer surfaces of the ends of second oxygen separation elements 18 and the inner surfaces of second enlarged end sections 96 to seal and connect the ceramic adapters 80 to the metal connectors 90. Such a glass to metal seal can be formed by applying a paste of the glass powder and a binder obtained from Ferro Corporation as a B73210 binder, heating the assembly to remove the organic binder and firing to a temperature that forms the glass seal.

Preferably, each of the metal connectors 90 can be constructed in the sections, 100, 102 and 103. Section 100 is provided with the second enlarged end section 96 of second axial bore 94 as discussed above. Sections 102 and 103 are a compression fitting in which the threaded portion, section 102, is welded to section 100 by a weld 104 and section 103 is welded to tube-like portions 72

The connection between the primary oxygen separation elements 18 and the metallic element formed by inlet manifold 20 can be applied to any like connection in which a ceramic is to be connected to a metal, for instance with tube sheet or other type of manifold. In this regard, metal connector 82 could be connected directly to such a metallic element which may or may not be provided with projecting portions, such as projections 70. In such case, metallic to ceramic junction 2 may not also include compression fittings such as designated by reference numbers 102 and 103. Moreover, the application of such junction is not limited to electrically driven oxygen separation elements. For example, pressure driven oxygen separation elements could be connected by the arrangement described above. For example, the operable oxygen ion transport element might consist of a dual phase conductor in which an ionic conductor were mixed with an electrical conductor to conduct oxygen ions and electrons, respectively. Additionally, tubes formed of mixed phase conductors could be used as well.

The junction described above is specifically adapted to join an electrically driven oxygen ion transport element to a metal manifold. In this regard, each of the ceramic adapters 24 can be provided with two vias 110 that are each filled with a silver inlay 112. A series connection can be made by looping (two loops illustrated) the conductors 54 around the outside of primary oxygen separation elements 18, in contact with the current collectors such as current collector 40, previously discussed, and held in place by, for example, silver paint 114. Similarly, the next succeeding primary oxygen separation element 18, electrical conductor 54 could be looped about the silver inlays 112 with the vias 110 and held in place by silver paint 116. Electrical contact can then be made within the interior of the next succeeding primary oxygen separation element 18 by way of a silver gauze 118 rolled up into a short tube and held in place by silver paint so as to make contact with silver inlays 112 and the current collector such as current collector 38 previously discussed.

Although the present invention has been described with reference to a preferred embodiment as will occur to those skilled in the art, numerous additions, omissions and changes can be made without departing from the spirit and the scope of the present invention as set forth in the presently pending claims.

We claim:

1. An apparatus for purifying a gas stream by removing oxygen from the gas stream to produce a purified gas stream, said apparatus comprising:

a primary separation zone comprising primary oxygen separation elements of tubular form to separate a primary portion of the oxygen from the gas stream and thereby to produce a partly purified gas stream, the primary oxygen separation elements connected between an inlet manifold and an outlet manifold such that the gas stream is divided into subsidiary streams, the subsidiary streams are introduced to the primary oxygen separation elements in parallel and are collected therefrom to produce the partly purified gas stream;

a secondary separation zone connected to the outlet manifold, the secondary separation zone comprising a secondary oxygen separation element of tubular form connected to the primary separation zone to separate a secondary portion of the oxygen from the partly purified gas stream, thereby to produce the purified gas stream;

the primary oxygen separation elements and the secondary oxygen separation element separating the primary portion of the oxygen and the secondary portion of the oxygen, respectively, through electrically driven oxygen ion transport;

a first electrical power supply connected to the primary oxygen separation elements to apply a first electric potential to the primary oxygen separation elements, thereby to drive the oxygen ion transport occurring within the primary oxygen separation elements, the primary oxygen separation elements electrically connected to one another in series;

a second electrical power supply connected to the secondary oxygen separation element to apply the second electric potential to the secondary oxygen separation element, thereby to drive the oxygen ion transport occurring within the secondary oxygen separation element; and an insulated enclosure to contain the primary separation zone and the secondary separation zone, the insulated enclosure having a heater to heat the primary and secondary oxygen separation elements to an operational temperature at which oxygen ion transport can occur.

2. A junction connecting a tubular ceramic oxygen ion transport element to a metallic element configured to introduce flow to or receive flow from the tubular ceramic oxygen ion transport element, said junction comprising:

a ceramic adaptor of tubular configuration, said ceramic adaptor having a first axial bore;

a metal connector having a second axial bore;

the tubular ceramic oxygen transport element partially telescoped within the first axial bore of the ceramic adaptor and the ceramic adaptor partially telescoped within the second axial bore of the metal connector such that flow communication for the flow is established between the tubular ceramic oxygen ion transport element, the first axial bore and the second axial bore;

a glass seal located between the tubular ceramic oxygen transport element and the ceramic adaptor such that the tubular ceramic oxygen transport element is connected to and sealed within the ceramic adaptor;

a glass to metal seal located between the second axial bore and the ceramic adaptor such that the ceramic adaptor is connected to and sealed within the metal connector; and the metal connector connected to the metallic element.

3. The junction of claim 2, wherein:

the first axial bore having a first enlarged end section to define a cylindrical sealing surface surrounding the tubular oxygen ion transport element;

the glass seal located between the first enlarged end section and the tubular oxygen ion transport element;

the second axial bore having a second enlarged end section surrounding the ceramic adaptor and the glass to metal seal is located between the second enlarged end section and the ceramic adaptor.

4. The junction of claim 3, wherein the metallic element is a manifold and the metal connector is connected to a projection, projecting from the manifold and forming part of the manifold.

5. The junction of claim 4, wherein, the metal connector is connected to the projection by a compression fitting forming part of the metal connector.

6. The junction of claim 3, wherein:

the tubular oxygen ion transport element has an electrolyte layer located between two electrode layers and two current conductor layers located adjacent the two electrode layers;

the ceramic adaptor has a via filled with silver laterally penetrating the ceramic adaptor and communicating with the first axial bore;

a silver mesh is positioned within the first axial bore so as to contact one of the two current conductor layers located within the tubular oxygen ion transport element and the via; and silver paint penetrating the silver mesh to hold the silver mesh in place.

* * * * *